US006578274B1

(12) United States Patent
Tango, Jr. et al.

(10) Patent No.: US 6,578,274 B1
(45) Date of Patent: Jun. 17, 2003

(54) CONSTRUCTION LAYOUT BLOCK

(76) Inventors: Ronald M. Tango, Jr., 211 Chapin Rd., Hudson, MA (US) 01749; Raynald L. Fortier, 171 Highland St., Hudson, NH (US) 03051

(*) Notice: Subject to any disclaimer, the term of this patent is extended or adjusted under 35 U.S.C. 154(b) by 0 days.

(21) Appl. No.: 09/742,789

(22) Filed: Dec. 20, 2000

Related U.S. Application Data

(60) Provisional application No. 60/185,147, filed on Feb. 25, 2000, provisional application No. 60/191,277, filed on Mar. 22, 2000, and provisional application No. 60/205,119, filed on May 18, 2000.

(51) Int. Cl.[7] .......... G01C 15/00

(52) U.S. Cl. .......... 33/1 G; 33/1 LE; 33/40 A; 33/760

(58) Field of Search .......... 33/1 G, 1 LE, 33/27.01, 27.02, 293, 404, 405, 413, 760, 756, 758, 759, 286, 535, 562, 567

(56) References Cited

U.S. PATENT DOCUMENTS

| | | | | | |
|---|---|---|---|---|---|
| 233,618 | A | | 10/1880 | Herzog | |
| 299,625 | A | * | 6/1884 | Covell | 33/413 |
| 1,225,464 | A | | 5/1917 | McIntire | |
| 1,271,470 | A | | 7/1918 | Ibaraki | |
| 1,643,695 | A | | 9/1927 | Bunger | |
| 2,570,458 | A | * | 10/1951 | Kowalczyk | 33/293 |
| 2,716,884 | A | * | 9/1955 | Rosenberg | 374/567 |
| 2,755,555 | A | * | 7/1956 | Spaeder | 33/293 |
| 2,819,037 | A | * | 1/1958 | Wilkin | 374/567 |
| 2,843,347 | A | | 7/1958 | King | |
| 2,853,785 | A | * | 9/1958 | Raifsnider | 33/760 |
| 3,122,836 | A | | 3/1964 | Aciego | |
| 3,242,576 | A | * | 3/1966 | Wheeler | 33/293 |
| 3,271,871 | A | * | 9/1966 | Foscarota | 374/535 |
| 3,273,252 | A | * | 9/1966 | Bunge | 374/535 |
| 3,328,890 | A | | 7/1967 | Fagerberg, Sr. | |
| 3,662,471 | A | | 5/1972 | Lynde | |
| 4,189,844 | A | * | 2/1980 | Riggins et al. | 33/414 |
| 4,381,607 | A | | 5/1983 | Place | |
| 4,386,485 | A | * | 6/1983 | Kramer | 52/108 |
| 4,488,809 | A | | 12/1984 | Miller et al. | |
| 4,499,666 | A | | 2/1985 | Smith | |
| 4,549,360 | A | * | 10/1985 | Allen | 33/293 |
| 4,622,752 | A | * | 11/1986 | Harra | 33/535 |
| 4,731,933 | A | * | 3/1988 | Cope | 33/1 LE |
| 4,733,477 | A | | 3/1988 | Fincham et al. | |
| 4,921,507 | A | | 5/1990 | Beyer | |
| 5,022,158 | A | | 6/1991 | Beyer | |
| 5,142,787 | A | * | 9/1992 | Dadisman | 33/1 G |
| 5,456,015 | A | | 10/1995 | Butcher et al. | |
| 5,621,975 | A | | 4/1997 | Rando | |
| 5,893,214 | A | | 4/1999 | Meier et al. | |
| 6,202,312 | B1 | * | 3/2001 | Rando | 33/227 |
| 6,230,416 | B1 | * | 5/2001 | Trigilio | 33/474 |

FOREIGN PATENT DOCUMENTS

| | | | | |
|---|---|---|---|---|
| FR | 790.558 | | 9/1935 | |
| JP | 01201113 A | * | 8/1989 | 33/293 |
| WO | WO-91/17410 A1 | * | 11/1991 | 33/286 |

* cited by examiner

*Primary Examiner*—Diego Gutierrez
*Assistant Examiner*—Mirellys Jagan
(74) *Attorney, Agent, or Firm*—Christopher John Rudy

(57) ABSTRACT

Construction layout block can be provided with a triangularly shaped body with a triangular bottom; a base wall and two side walls extending up from the bottom; base wall junctures formed about intersections of the base wall and the side walls, and an apex juncture formed about intersections of the side walls. It may have one or more of an artifice capable of holding a chalk line; top, with a top carrying handle; a laser target notch; a rear reference system; a top alignment system; a ruler scale; an intrinsic level; and a contrivance for holding a tape measure by its distal end. The block has relative immovability, in general, to resist the force of pulling on a chalk line with the same attached to the block during layout. A construction layout block of any shape may be plastic-coated.

20 Claims, 4 Drawing Sheets

FIG. 1
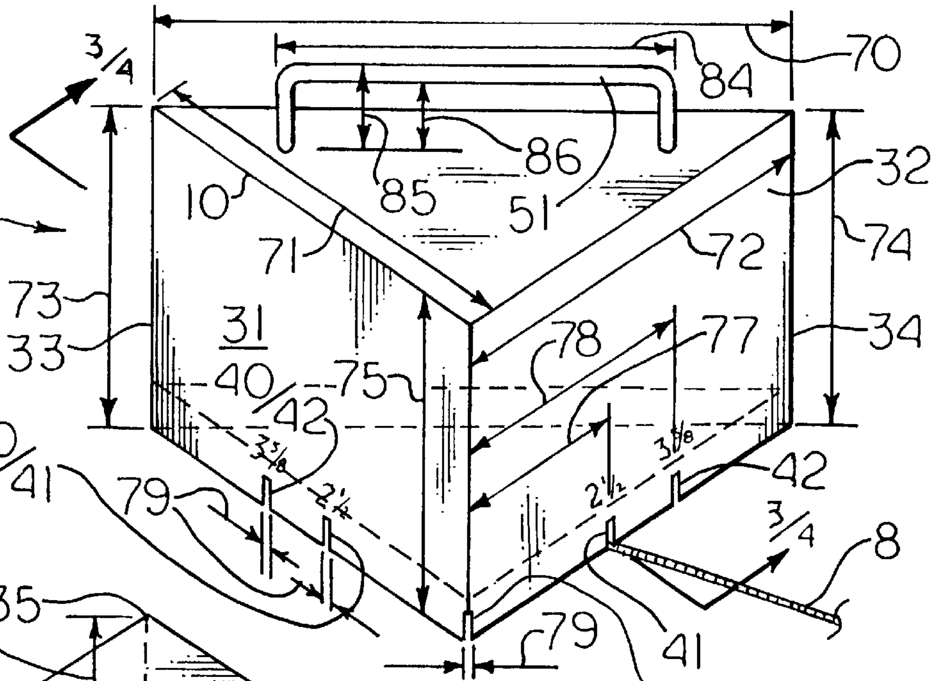
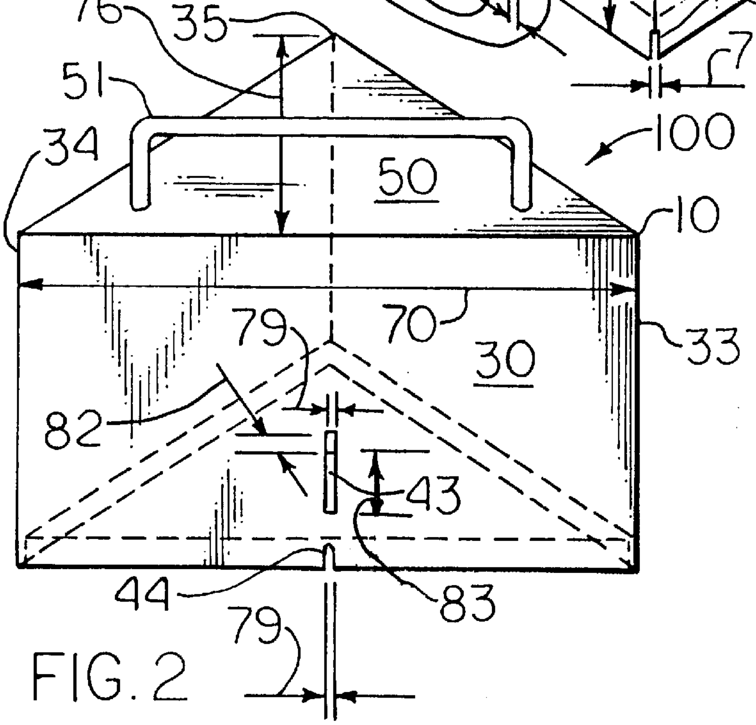
FIG. 2
FIG. 3
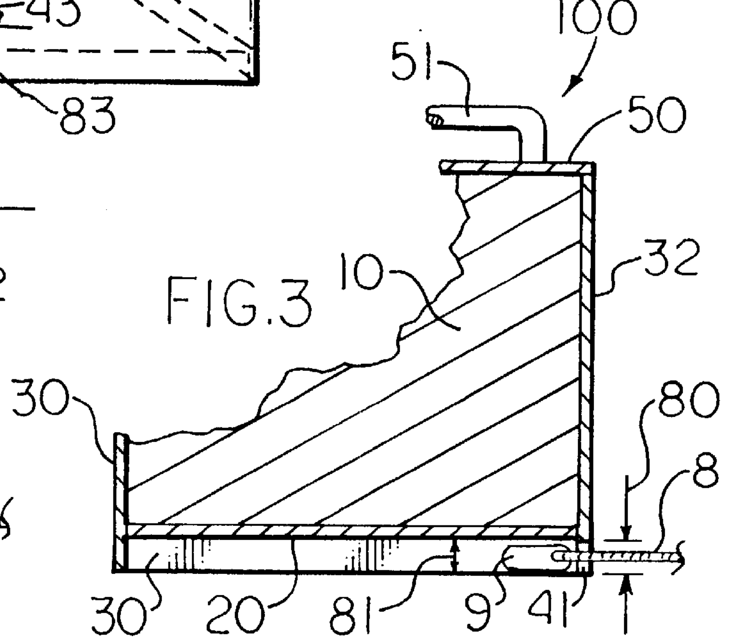
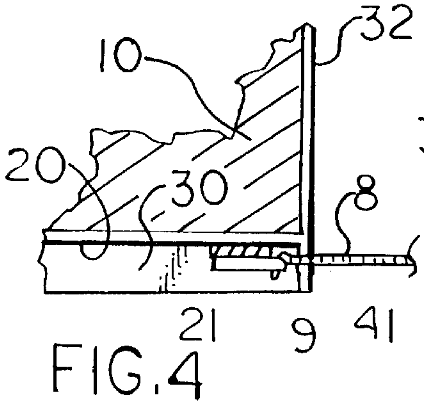
FIG. 4

CONSTRUCTION LAYOUT BLOCK

CROSS-REFERENCE CLAIMS OF PRIORITY

Benefit under 35 USC 119(e) is claimed of U.S. provisional patent application Nos. 60/185,147 filed Feb. 25, 2000; 60/191,277 filed Mar. 22, 2000; and 60/205,119 filed May 18, 2000. The complete specifications of these provisional applications are incorporated herein by reference.

BACKGROUND TO THE INVENTION

I. Field of the Invention

The present invention concerns a layout block useful for laying out a building plan onto a construction site or building. The block, in general, can include a built-in chalk line notch or notches, and it can include a laser sighting feature and/or an arc-drawing guiding pin, a tape measure notch, and so forth. In a particular embodiment, the block has a triangular shape.

II. Problems and Known Art

In the customary practice of laying out a building plan onto a construction site or building, a job typically takes two men: one who holds the distal end of a chalk line at a predetermined place on the site or building, and another who holds the proximal end of the chalk line at another predetermined place; upon proper alignment of the chalk line, it is snapped, and a first layout line is made. A second layout line parallel to the first is then laid out and snapped. This method is repeated until the site or building layout is complete. In an effort to reduce the manpower required to do the job, the current alternative to the foregoing has one man laying out the site or building: carrying with him a five-gallon bucket full of water, cement or the like ballast, he uses the heavy bucket (and the force of gravity) to hold the distal end of the chalk line at a place on the site or building, runs out the chalk line, holds it at a proximal point, and snaps it. He then goes to the bucket, measures a distance from the first layout line, lifts the bucket, moves it and the distal end of the chalk line, securing that end of the chalk line between the bucket and the ground or floor, and goes to, measures and sets and snaps by the proximal end of the chalk line so as to make the second layout line parallel with the first. Such methods, by requiring manual measurements at the distal end of the chalk line, inherently have a propensity to introduce error into the layout. Moreover, the first method takes a relative abundance of manpower to accomplish, and the second, although it would reduce the manpower required to do the job, is cumbersome to carry out and by its clumsiness can both take an inordinate amount of time and propagate additional errors into the layout. Furthermore, if an arc is to be struck on a layout site, for example, on the floor, the workman habitually drives a nail into the floor, and placing the eye of a tape measure end to mate with the head of the nail, and pulling on the tape with a pencil held against the tape at a predetermined distance, strikes the arc. Although that arc-making technique is fairly adequate for many applications, difficulties arise in accurately setting the nail, as if it is not set right the first time moving it close by the first attempt can be difficult if not impossible owing to the first nail hole, and in being able to strike an arc over a floor type surface into which a nail cannot or should not be placed, for example, in dirt, concrete or a finished hardwood floor. In addition, other construction layout chores such as those using a tape measure, those in which a height on a wall is laid out or checked, and so forth, are encountered, and these typically involve "free hand" employment of the rule or line.

It would be desirable to improve over the foregoing.

Certain construction, drawing, and layout aids are known. For example, art disclosed within the following U.S. patents may be of possible interest with respect to the present invention:

U.S. Pat. No. 233,618: Draftsman's Triangle.

U.S. Pat. No. 299,625: Device for Laying Out Tennis Grounds.

U.S. Pat. No. 1,225,464: Drafting Instrument.

U.S. Pat. No. 1,271,470: Carpenter's Marking Line.

U.S. Pat. No. 1,643,695: Frame Square and Gauge.

U.S. Pat. No. 2,843,347: Support for Engineer's Plumb Rod and Highway Warning Signal.

U.S. Pat. No. 3,122,836: Line Holding Device.

U.S. Pat. No. 3,328,890: Layout and Marking Tool.

U.S. Pat. No. 3,662,471: Measuring Tape and Chalk Line Holding Tool.

U.S. Pat. No. 4,381,607: Carpenter's Tool.

U.S. Pat. No. 4,488,809: Planizing Target.

U.S. Pat. No. 4,499,666: Universal Framing Layout Tool.

U.S. Pat. No. 4,731,933: Protractor-chalkline.

U.S. Pat. No. 4,733,477: Chalk Line Framing Square.

U.S. Pat. No. 4,921,507: Layout Device.

U.S. Pat. No. 5,022,158: Wall Marking Layout Device.

U.S. Pat. No. 5,456,015: Construction Framing Square.

U.S. Pat. No. 5,621,975: Remotely Controlled Self-leveling Laser Instrument with Modular Capability.

No. 5,893,214: Measuring Ball Reflector.

French patent 790,558 (1935) may be of possible interest as well. The foregoing art, however, does not provide a basic, convenient, practical solution to the aforementioned problems in the art of construction layout, and, the present invention aside, there remains in the art a long-felt need to effectively address and ameliorate, if not completely overcome, such problems and other difficulties known generally in the art of construction layout.

SUMMARY OF THE PRESENT INVENTION

In general, provided hereby is a construction layout block comprising a triangularly shaped body having a triangular bottom, a base wall and two side walls extending up from said bottom, generally with junctures formed about intersections of said base wall and said side walls, termed base wall angle junctures, and of said side walls, termed an apex juncture; and, preferably, an artifice capable of holding a chalk line—which may include a first artifice capable of holding the chalk line positioned inclusively from a first of the base wall angle junctures to the apex juncture, and at least one second artifice capable of holding the chalk line positioned from a second of the base wall angle junctures and up to but excluding the apex juncture. Also preferably, a laser target notch is present, especially one having an intrinsic laser card sight on a wall thereof. The block has relative immovability to resist a force of pulling on a chalk line or tape measure when such is/are attached to the block during layout. Beneficially, the layout block is generally in the form of a right isosceles triangular prism. Additional features may be present, for example, additional artifices for holding a chalk line, a rear reference system, a carrying handle, a ruler scale, an intrinsic level, a contrivance capable of holding a tape measure by its distal end, and so forth and the like. Further, a plastic-coated construction layout block, which need not have the laser target notch or necessarily be triangular in shape, is also provided. Compare, the aforesaid provisional patent application Nos. 60/185,147; 60/191,277; and 60/205,119.

Provided in addition are further embodiments of a construction layout block. These can include those in which a line-securing artifice is present along a vertical portion of the block, and those in which an alignment groove is present, say, along the top of the block. Additional embodiments are extant.

The invention is useful in site and building layout.

Significantly, by the invention, a construction site or building can be laid out by one man, and this with a high degree of accuracy and efficiency. The contrivance capable of holding a tape measure by its distal end can greatly facilitate measurement of distances from layout lines, walls, and so forth, and suitably embodied can greatly facilitate the striking of an arc quickly and accurately. The built-in laser target sight can facilitate the layout as well. Thus, whereas with the customary methods it can take two men one or two days to layout a building site, with the present invention the layout of the same building site may take one man one day. The invention is simple to make, and simple and accurate to use, and durable as well as practical.

Numerous further advantages attend the invention.

DRAWINGS OF CERTAIN EMBODIMENTS OF THE INVENTION

The drawings form part of the specification hereof. With respect to the drawings, which are not necessarily drawn to scale, the following exemplary matter is briefly noted:

FIG. 1 is a front, top perspective plan view of a triangularly shaped construction layout block of the invention including contrivances for holding a tape measure by its distal end, and an intrinsic laser sight. This layout block also contains additional features including additional artifices for holding a chalk line, a ruler scale, a handle, and a level.

FIG. 2 is a rear, top perspective plan view of the block of FIG. 1, which shows an additional feature of a rear reference system including a notch and a sighting fin, the fin being generally rectangular in shape.

FIG. 3 is a sectional view of the block of FIGS. 1 & 2, taken along 3/4—3/4 from FIG. 1.

FIG. 4 is a sectional view of another embodiment of a block as of FIGS. 1 & 2 with a magnet to attract a chalk line with a ferrous end, also taken along 3/4—3/4 in FIG. 1.

Figure 12:
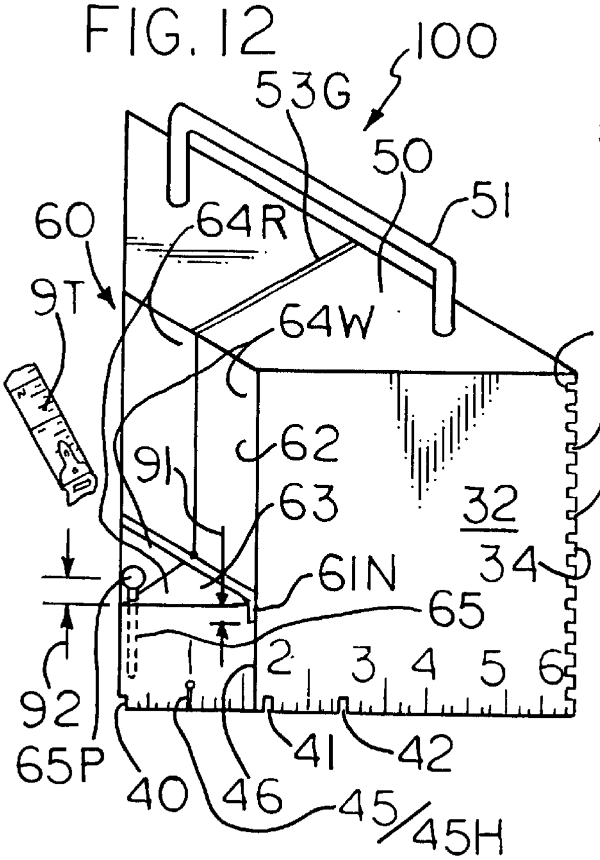

FIG. 12 is a front, right, top perspective view of another embodiment of a construction layout block of the invention, with not only horizontal but also vertical artifices for holding a chalk line, and with an alignment groove, a laser target notch with a groove, a guide line, and so forth, ready to receive a tape measure in its arc-guiding anchor in its laser target notch, or in the groove in its laser target notch.

Figure 13:
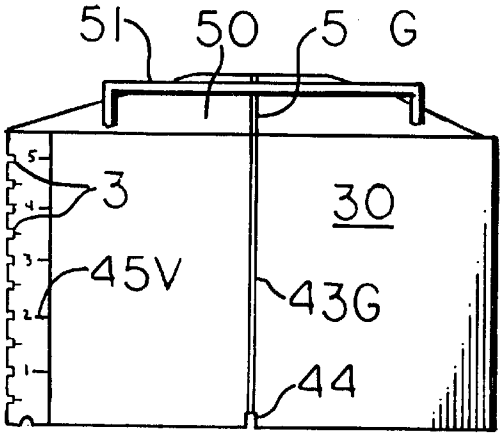

FIG. 13 is a rear, top perspective view of the block of FIG. 12, showing a rear portion to its alignment groove and system.

Figure 14:
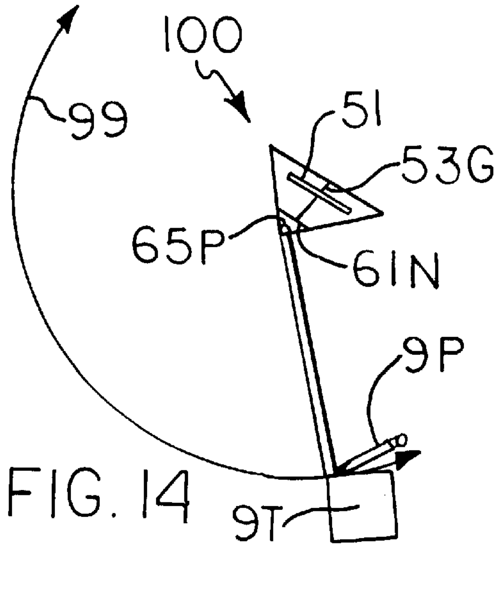

FIG. 14 is a top plan view of a block as seen in FIGS. 12 & 13, in use, with an operator (not illustrated) striking an arc with a pencil with the tape measure fitted over the arc-guiding anchor of the block. Compare, analogous adaptability of a block as of FIG. 11.

Figure 15:
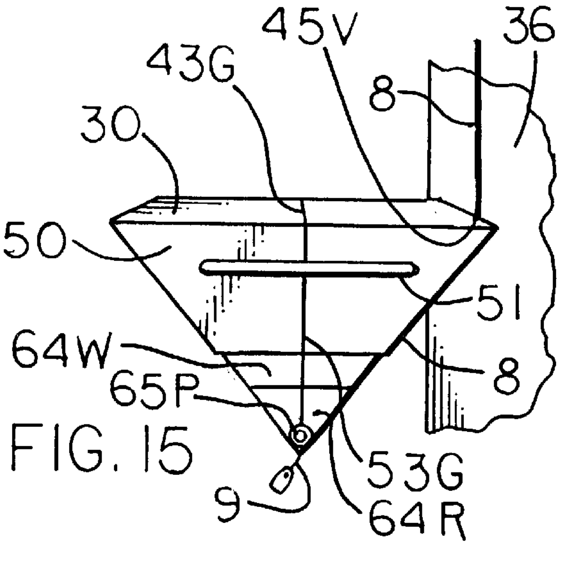

FIG. 15 is a slight rear, top perspective view of the block of FIGS. 12–14, in use in snapping a horizontal line on a wall.

Figure 16:
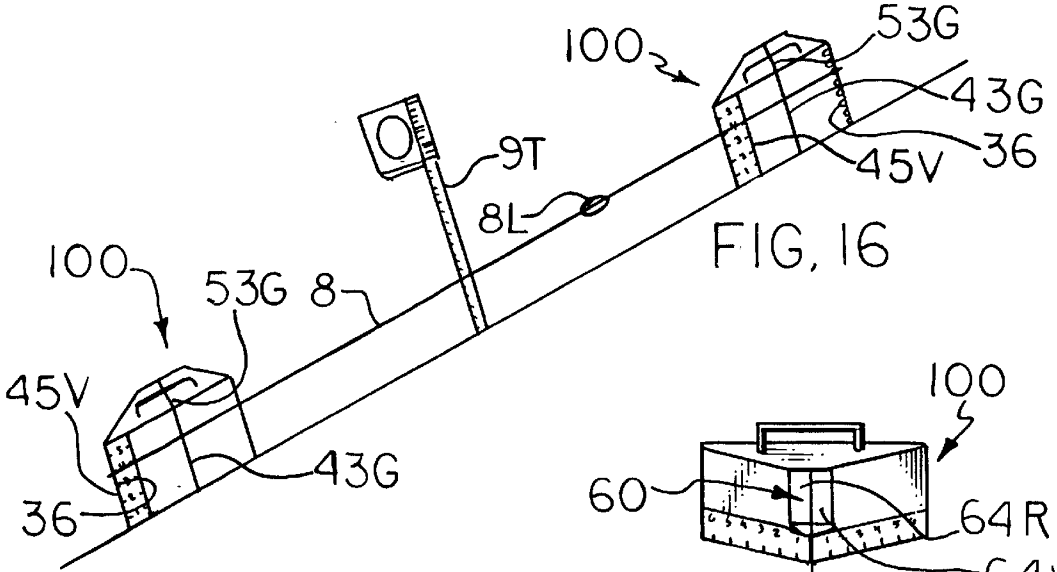

FIG. 16 is a rear plan view of two construction layout blocks of the invention, each such as in FIGS. 12–15, in use setting a horizontal line.

Figure 5:
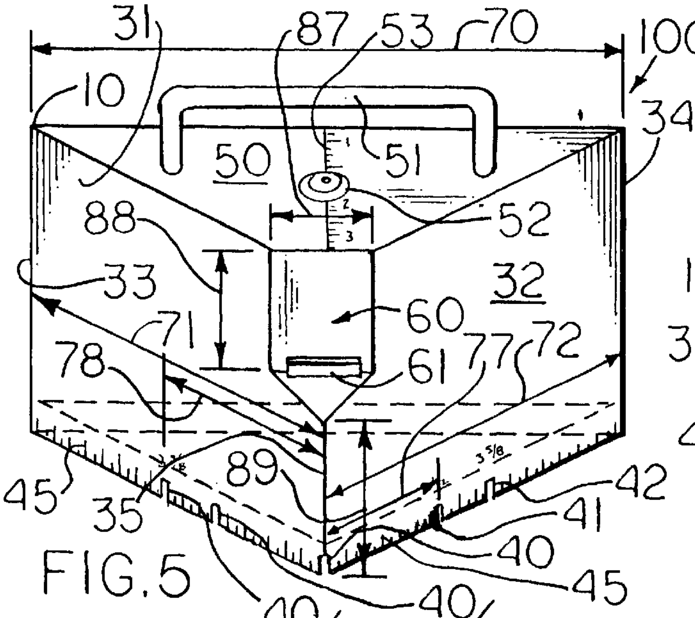
FIG. 5 is a front, top perspective plan view of another construction layout block embodiment of the invention, further having additional features of a level, a ruler scale, and a laser target notch which can accommodate a laser target card.
Figure 6:
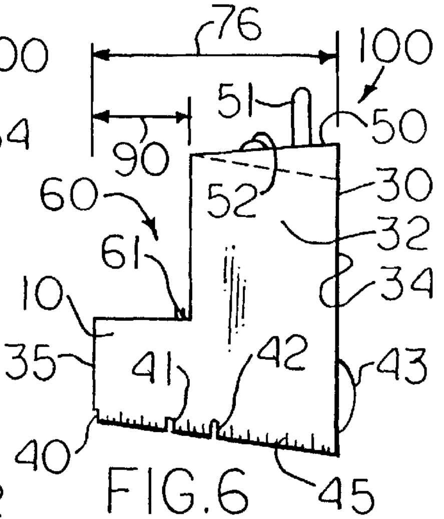
FIG. 6 is a right side plane view of the block of FIG. 5, which shows a rounded rear sighting fin.
Figure 7:
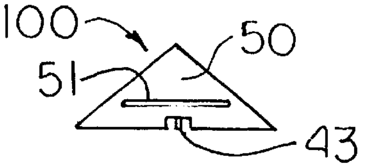
FIG. 7 is a top view of another embodiment of a construction layout block of the invention, with a recessed rear sighting fin.
Figure 8:
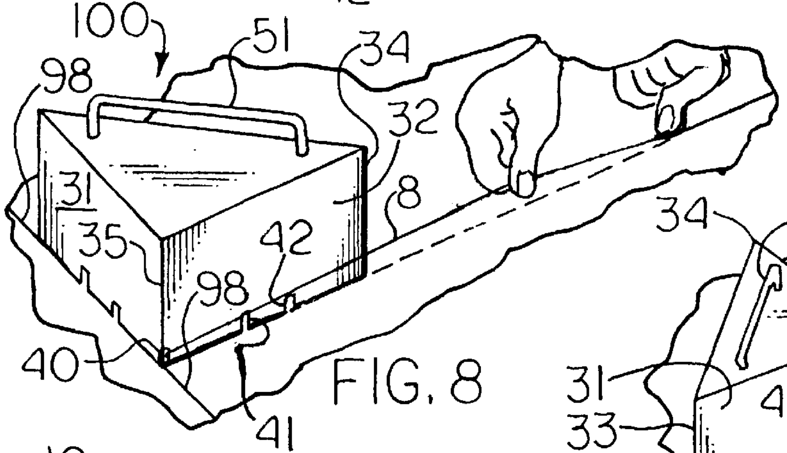
FIG. 8 is a front, slightly right, top perspective view of a block as seen in FIGS. 1–3, in use, with a man snapping off a base chalk line mark from a reference line.
Figure 17:
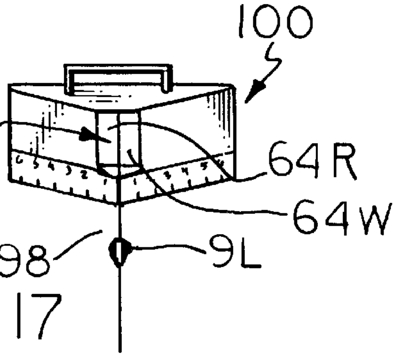

FIG. 17 is a front, top perspective view of a construction layout block such as depicted, in general, in FIGS. 5 & 6, in use during laser alignment. Compare, similar adaptability of a block as of FIG. 12.

Figure 18:
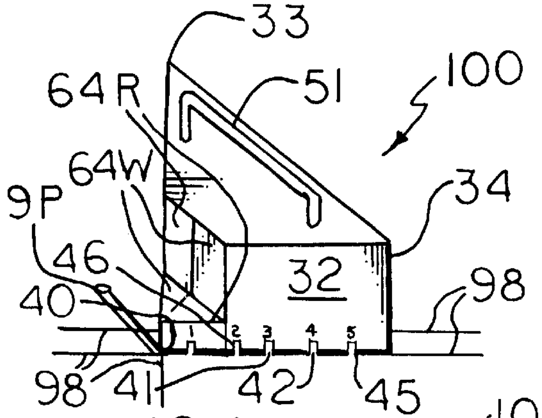

FIG. 18 is a right, top perspective view of a block as employed in FIG. 17, as from FIGS. 5 & 6, also showing a guide line and so on, in use as a square. Compare, similar adaptability of a block as of FIGS. 1 & 12.

Figure 19:
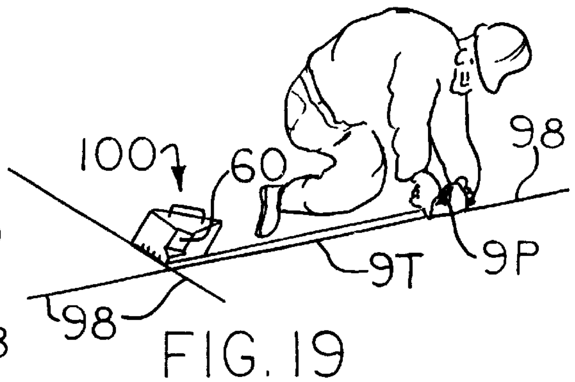

FIG. 19 is a left, front, top perspective view of a block as employed in FIG. 17, as from FIGS. 5 & 6, in use as a squaring anchor for a tape measure. Compare, similar adaptability of a block as of FIGS. 1, 7, 11 & 12.

Figure 20:
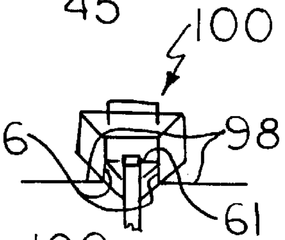

FIG. 20 is a front, top perspective view of a block as employed in FIG. 17, as from FIGS. 5 & 6, in use as another type of anchor for a tape measure. Compare, similar adaptability of a block as of FIG. 12.

Figure 21:
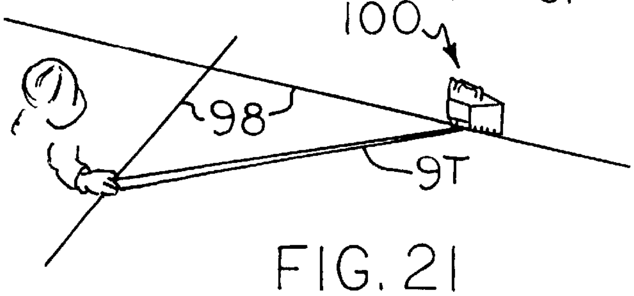

FIG. 21 is a right, top perspective view of a block as employed in FIG. 17, as from FIGS. 5 & 6, in use as a reference anchor to check the square of a set of laid out chalk lines. Compare, analogous or similar adaptability of a block as depicted in FIGS. 1, 7, 11 & 12, especially FIG. 12.

Figure 22:
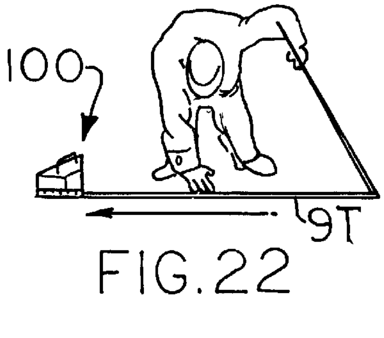

FIG. 22 is a left, top perspective view of a block as employed in FIG. 17, as from FIGS. 5 & 6, in use as a backstop for making tape measurements. Compare, similar adaptability of a block as depicted in FIGS. 1, 7, 11 & 12.

DETAILED DESCRIPTION OF ILLUSTRATIVE EMBODIMENTS OF THE INVENTION

The invention can be further understood by the present detail, which may be read in view of the drawings. Such is to be taken in an illustrative and not necessarily limiting sense.

In general, the construction layout block of the invention is suitably shaped. Preferably, in general, the construction layout block has a triangularly shaped body with a triangular bottom, a base wall and two side walls extending up from the bottom. Generally in such form, junctures are formed about intersections of the base and side walls, which are termed base wall angle junctures, and are formed about the intersection of the side walls, which is termed an apex juncture. An artifice, which may be termed a first artifice, can hold a chalk line or other line, preferably, which artifice is positioned inclusively from a first of the base wall angle junctures to the apex juncture. At least one second artifice capable of holding the chalk line from a second of the base wall angle junctures and up to but excluding the apex juncture can be beneficially provided also; with such first and second artifices oriented horizontally with respect to each other, at least one chalk or other line-holding artifice may be positioned vertically, say, along a base wall or a base wall apex juncture. Desirably, the layout block is generally in the form of a right isosceles triangular prism. At least one contrivance capable of holding a tape measure by its distal end can be provided. Optionally but preferably, the layout block also has a laser target notch, especially one having an intrinsic laser card sight on a wall thereof. Additional features may be present, for example, additional artifices for holding a chalk line; a rear and/or top reference system; a carrying handle; a ruler scale, to include horizontally and/or vertically oriented ruler scales; a level; and so forth and the like.

With reference to the drawings, construction layout block 100 is useful for laying out a building plan onto a construction site or building with chalk line 8 typically having distal tab 9 (FIGS. 1, 3, 4, 8–10, 14–16) and in general includes triangularly shaped body 10 having triangular bottom 20. The block 100 may also be used in conjunction with a line level 8L, laser beam mark guide 9L, pencil 9P and/or tape measure 9T (FIGS. 12, 14, 17–22). Magnet 21 may be affixed to the bottom 20 to hold a suitable metal tab 9 (FIG. 4) such as containing magnetic iron.

Base wall 30 and two side walls 31, 32 can extend up from the bottom 20 and generally define junctures 33, 34, 35 formed about intersections of the base wall 30 and side walls 31, 32. Such may be termed first base wall angle juncture 33 and second base wall angle juncture 34, and about intersections of the two side walls 31, 32, which may be termed apex juncture 35.

Vertically positioned chalk line holding artifice(s) 36 may be provided on any appropriate feature or set of features, to include on the wall(s) 30, 31, 32 and/or junction(s) 33, 34, 35. For example, along the junction(s) 33, 34 may be provided as such artifices 36, notches that may hold chalk line 8 or another wire, string or other line when it is inserted in the notch, and the artifices 36 may be provided at any interval, say with ¼-inch or ½-inch spacing between them (FIGS. 12, 13, 15, 16).

The block 100 can include first artifice 40 capable of holding the chalk line 8 when it is positioned from and including the first base wall angle juncture 33 to and including the apex juncture 35 but which, although the first artifice may be resident on a wall between two junctures, preferably is defined about a position by the apex juncture 35 itself. For instance, although the artifice 40 can be any suitable contrivance such as a peg, a hook, a loop, a button, and so forth and the like, beneficially it is in the form of a notch or slit opening to the bottom, through a lower part a wall or walls, into which notch the distal tab 9 of the chalk line 8 may be inserted and lodged behind with the line itself threaded out through to secure it until repositioning of the line 8 and tab 9 (FIGS. 1, 5–6, 8–10, 12, 17, 18). In order to accomplish this, the block 100 can be lifted slightly to thread the line 8 into the notch 40 and place the tab 9 behind the wall(s) in which the notch 40 resides, advantageously keeping the bottom portion of the base wall opposing the notch 40 on the surface to be marked to minimize movement of the block 100. The block 100 also can include second artifice 41 likewise capable of holding the chalk line 8 or other line, which artifice 41 is positioned, say, at a locus from one of the base wall angle junctures 33, 34 up to but not including the apex juncture 35; thus, when the first artifice 40 is resident about the apex juncture 35, a second artifice 41 can be resident on the wall 31 and/or the wall 32, but, say, when the first artifice 40 is on the wall 31 between the base wall angle and apex junctures 33, 35, the second artifice 41 is resident on the wall 32 between the base wall angle and apex junctures 34, 35. For example, the artifice 41 can be a notch the same as or analogous or similar to the notch 40 in construction and use.

The block 100 has the property of relative immovability so that it can resist the force of pulling on the chalk line 8 when the line 8, other line, or tape measure 9T is attached to the block 100 during layout. This may be provided by having a bottom of a material with a high friction coefficient, by providing spikes on the bottom, by employing magnetic force as may be appropriate, and so forth and the like; preferably, however, the relative immovability is accomplished by providing the block 100 with sufficient mass to resist the necessary force of layout with the chalk line 8, other line, or tape measure 9T. Typically, such mass is provided for the most if not entire part from the body 10, which thus can be made of wood, cement, concrete, or a metal or alloy such as copper, iron, lead, mercury, brass, steel, and so forth and the like. For example, the block 100 can have a stainless steel bottom 20, walls 30, 31, 32 and top 50, which define an interior which can be filled with lead to form the substance of the body 10. As alternatives, the block 100 may be made so that the mercury or sand, stones, water and so forth and the like may be poured into an interior cavity to provide the mass. Further, the body 10 can be made from such materials and be coated with a suitable plastic to provide protection from corrosion and provide a degree of comfort if the block were to come in contact with a person; as an alternative, the body 10 can be made to have a plastic shell and be filled, for example, with dust, metal shavings or powder, sand, copper, lead or steel shot, beads, stones, cement, and so forth and the like; as another alternative, the body may be made of a monolithic plastic matrix, which may be pure plastic, or be augmented by a heavy filler such as dust, metal shavings or powder, sand, copper, lead or steel shot, beads, stones and so forth and the like. Examples of the plastic may include a polyolefin to include a polyethylene, a polypropylene, and so forth, and a mixture thereof; a polyurethane, a polyurea, a polyurethaneurea, a polyisocyanurate, and so forth and the like, and a mixture thereof; a nylon; a polyacetate; a polyamide, a polyimide, and so forth, and a mixture thereof; an artificial or natural rubber; and so forth and the like. A mass which provides for an earthly weight about from ten to twenty-five pounds may be employed. For example, a weight of about fifteen pounds can be advantageous in that it may be heavy enough to provide for the relative immovability and yet be light enough to be repositioned without excessive effort.

Figure 10:
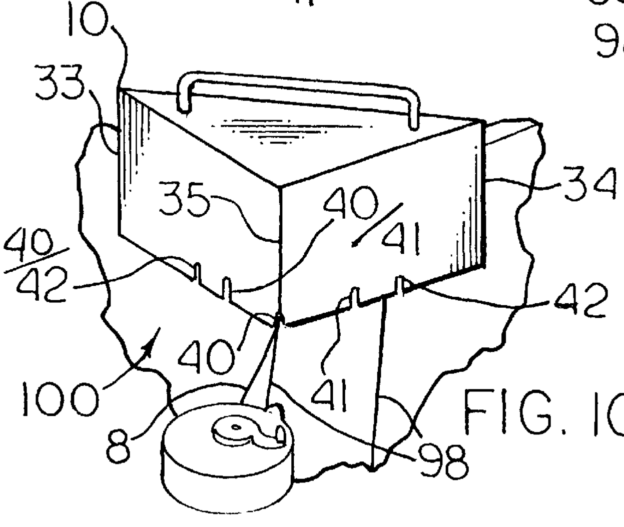
FIG. 10 is a front, top perspective view of the block from FIGS. 8 & 9 in use, aligned, to include through use of the rear reference system, and ready for the man to resnap a chalk line mark which had faded owing to foot traffic at the construction site.
Figure 11:
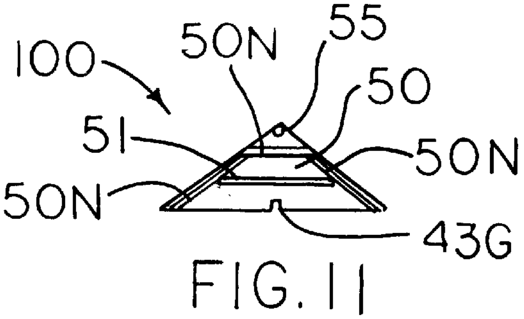
FIG. 11 is a top view of another embodiment of a construction layout block of the invention, with an arc-guiding pin in place on the top of the block as one of the contrivances for holding a tape measure, and top notches or grooves as other contrivances for holding the tape measure.

Additional features may be present with the block 100. For example, additional, third artifices 42, and even more artifices for holding the chalk line 8 about the back 30, face(s) 31, 32, junction(s) 33, 34, 35, top 50 and so forth can be provided, each of which, for example, may be in the form of a notch such as the notches 36, 40, 41. A rear reference guide system can be provided, which can be in the form of fin 43 and notch 44 targeting sight system (FIGS. 2, 6, 7), or, say, may simply be in the form of a groove 43G without a fin (FIGS. 11, 13, 15, 16)—which reference system is beneficially located about the midpoint of the base wall 20. Beneficially, ruler scales 45 are provided. The ruler scales may include horizontally oriented scales 45H or vertically oriented scales 45V or both (FIGS. 12, 13, 16) and may be indicated in any relevant scale, for example, in the English and/or metric system(s). Advantageously, complimentary marker scales 46 are provided (FIGS. 12, 18, 20, 21). For example, the marker scales 46 may be provided in the form of red colored lines. The top 50 can define a surface which opposes the bottom 20. A top groove, slot or notch 5ON may be provided, say, parallel with the walls 30, 31, 32, 32, sufficient to hold the distal end of a tape measure 9T as an anchor to make measurements therefrom (FIG. 11). A top reference guide system 53 may be provided, for example, fine top groove 53G, to assist in aligning the block 100 (FIGS. 5, 12–16). Carrying handle 51 is advantageously provided (FIGS. 1, 2, 4–22). Intrinsic level 52 may be provided (FIGS. 5, 6). Other dimensional indicia may be provided, for example, in conjunction with or an the top reference guide system 53, so as to indicate the distance between the rear wall 30 and laser target notch 60/clip 61 such as 3⅜ inches (FIG. 5). A device for holding the distal end of a tape measure may be provided in the form of a top hole 55, which may hold that end of the tape measure itself or be one into which a post or nail with a head is inserted so that the head may serve to anchor the orifice common to the end of tape measures (FIG. 11). Other additional features may be provided.

As alluded to above, the block of the invention can include at least one device for holding the distal end of a tape measure. In this connection, such a device can be in the form of a groove, slot or notch 50N (top) or 61N (laser card sight target groove or slot) which advantageously may run in segment(s) parallel with one or more of the walls 30, 31, 32 so that the distal, hooked end of a tape measure 9T may be inserted therein and distances determined generally perpendicular to the wall 30, 31 or 32 to which the notch 61N would run parallel (FIGS. 11, 12, 14). Of course, a slot or notch comparable to the notch 50N, or groove or slot 61N need not run parallel with any wall. The groove, slot or notch 50N but especially the groove or slot 61N may be employed to serve as a card retaining slot, into which a commercially available laser card (not illustrated) can be positioned for reference sighting, or another tool such as the clip end of a tape measure may be secured. Preferably, the groove or slot 61N lines up with the complimentary marker scales 46 (FIGS. 12, 18, 20, 21). As well, the device for holding the distal and of a tape measure can be in the form of a hole 65 akin to the hole 55 and/or pin or nail 65P or the like in a step for a laser card sighting device. Advantageously, the pin 65P is upstanding and has a head about its top part. Again, the hole 55 as well as the hole 65 may be provided in a dimension suitable to hold the distal end of the tape measure 9T by insertion of the end into the hole directly, with or without adaptation of the end of the tape measure for accommodation therewith, or, as an alternative, a simple pin or nail, say in step pin 65P can be placed in the hole 65 (FIGS. 12, 14, 15) with the nail 65P having the head on which the eye of the end of the tape measure 9T can engage in a hooking fashion to aid in drawing a radius on a large variety of floors, including sand, dirt, carpet, cement, metal, wooden subfloor, finished linoleum, tile, wood, vinyl, and so forth and the like (FIG. 14). The pin or nail 65P may be removable as such, or it may be permanently affixed to the block 100. As further alternatives, it may be raisable and lowerable and more or less permanently affixed to the block by making it in the form of a screw that would be raised or lowered in a threaded hole, or, say, by having it retractable into a hole with a device fashioned in a manner akin to a spring-loaded retractable ink pen or the like. The device for holding the distal end of a tape measure may take other forms, as any person skilled in the art would understand, and these, as are various other modifications, are contemplated to be in the spirit and scope of the present invention.

The block 100 can include the laser target notch 60 (FIGS. 5, 6, 12–22). The notch 60 can include laser card clip 61 (FIGS. 5, 6, 20) and/or the groove or slot 61N (FIGS. 12, 14) and includes rear laser target notch wall 62, which may be termed a step riser, which is preferably parallel to the rear wall 30; and laser target notch bottom 63, which may be termed a step tread, which is preferably parallel to the plane formed by the lowermost portions of the block 100 that rest on the construction site surface such as the lowermost portions of the walls 30, 31 & 32. The laser card clip 61 also may function as the device for holding the distal end of a tape measure, as noted above with respect to the groove or slot 61N (FIG. 20). Intrinsic laser card eight 64 is built-in, for example, by painting on the step riser 62 and step tread 63 in a checkerboard pattern alternating red areas 64R and white areas 64W.

The layout block 100 depicted in the drawings is generally in the form of a right isosceles triangular prism with the right angle at the apex juncture 35. Although such a prismatic shape is highly beneficial overall, other shapes, especially triangular shapes, may be employed as may be desired.

Sizes in the construction layout blocks of the invention may vary. As well, as previously mentioned, the mass and materials of the construction layout block may vary, and may be related to its size. Dimensions, which are given in inches (") and which may be considered to be approximate, for an approximately fifteen pound, lead-filled, stainless steel-walled construction layout block 100 as depicted, in general, are exemplary:

| Reference(s) | Dimension(s) | Reference(s) | Dimension(s) |
|---|---|---|---|
| 70 (FIGS. 1, 5) | 9-1/4" | 83 (FIG. 2) | 2-1/8" |
| 71, 72 (FIGS. 1, 5) | 6-1/2" | 84 (FIG. 1) | 5-1/2" |
| 73, 74, 75 (FIG. 1) | 5" | 85 (FIG. 1) | 1-3/4" |
| 76 (FIGS. 2, 6) | 4-1/8" | 86 (FIG. 1) | 1-1/2" |
| 77 (FIGS. 1, 5) | 2-1/2" | 87 (FIG. 5) | 2-1/2" |
| 78 (FIGS. 1, 5) | 3-5/8" | 88 (FIG. 5) | 3-1/2" |
| 79 (FIG. 1) | 1/16" | 89 (FIG. 5) | 1-1/2" |
| 80 (FIG. 4) | 1/8"–3/8" | 90 (FIG. 6) | 1-1/4" |
| 81 (FIG. 4) | 1/8"–1/4" | 91 (FIG. 12) | 1/4" |
| 82 (FIG. 2) | 3/8" | 92 (FIG. 12) | 3/8". |

Figure 9:
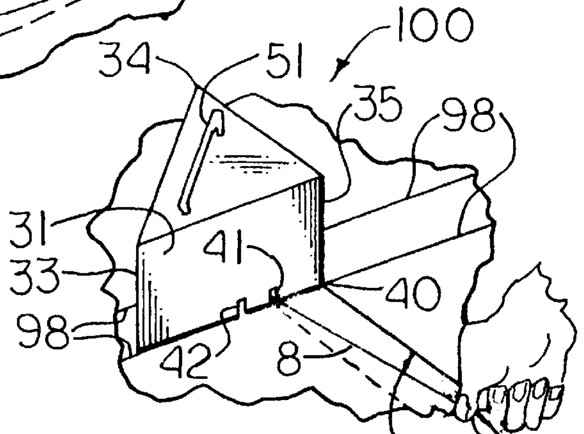
FIG. 9 is a slightly front, left, top perspective view of the block from FIG. 8 in use, the man snapping off a finishing line mark parallel to a base chalk line mark.

With special reference to FIGS. 8–10, 12 and 14–22, the construction layout block 100 can be used in a beneficial manner. With the block 100 aligned with the face of the side 31 along a reference line, using a notch 40, preferably the one about the apex 35, into which the distal end of the chalk line 8 is inserted, and a side, for example, side 32, along which the chalk line 8 is aligned, a chalk line mark 98 is snapped (FIG. 8) which may be from a worker operating at the proximal end of the chalk line 8 distance away. This may be termed a base line. Next, the distal end of the chalk line 8 is removed from the notch 40 and then is positioned in the notch 41, may, for two and one half inch track spacing, and the operator goes the appropriate distance away and snaps a line mark 98 parallel to the base line (FIG. 9). Lines 98 up to one hundred feet or more may be accurately snapped with the layout block 100. The block 100 is then realigned for the next wall, and the method repeated. The block 100 may be used in many other ways, for one example, to resnap a chalk line mark that had faded owing to foot traffic at the construction site, in which the base wall 30 and apex 35 are conveniently used in conjunction with the rear reference system 43, 44 (FIG. 10). The distal end of a tape measure 9T can be hookingly attached to a measure-anchoring feature such as the upstanding pin 65P, and radii can be inscribed effectively using a pencil 9P, the tape measure 9T, and the block 100 (FIGS. 12, 14). Vertical heights can be snapped or checked using the layout block(s) 100 alone or in groups, each block 100 having, say, a set of vertical notches 36 and/or a vertical scale 45V (FIGS. 15, 16); levels may be checked by use of a line level 8L on the chalk line 8 or other line which is set in corresponding notches 33N, 34N (FIG. 16). The block 100 with a laser target notch 60 with sight 64 and/or 64R, 64W, can be used for laser sighting employing a laser sighting instrument, being aligned, for example, with the laser eight guide mark 9L (FIG. 17). The block 100 may be used to mark off a square, say, when an operator would like to darken a layout line with a pencil 9P (FIG. 18). It may be used as a reference point anchor to lay out distances along an established chalk line 98 with a pencil 9P and tape 9T (FIG. 19); as a stabilizing anchor to hook the end of a tape measure 9T on, in the groove or slot 61N, to make measurements from a chalk line 98 using the mark 46 as a base (FIG. 20); as a weighing anchor in checking the square of a set of perpendicular chalk lines 98 to hold down the distal end of a tape measure 9T along one chalk line 98 from which point a measurement is taken along the other chalk line 98 (FIG. 21) and calculating according to the Pythagorean theorem; and as a backstop to which the dummy end of a tape measure 9T can be butted to make measurements (FIG. 22).

Other uses of the construction layout block 100 can include its use as a ruler and/or level if so equipped (FIGS. 5, 6, 12, 13, 15–22). In addition, the layout block 100 can be used in other ways (not illustrated): as an anchor to hook the end of a tape measure 9T on, in a groove or slot 61N, to make measurements parallel with, say, the wall 30 and perpendicular to a building wall against which the wall 30 of the block 100 is registered, as one only need add the value of the dimension from the wall to the clip 61 such as can be indicated by the dimension indicia 53 engraved on the top 50, to obtain the full distance to a wall (and any fin 43 can also be taken into account in the distance indicated by the indicia 53 as well); or it can be used as a chalk line anchor against and at a lower part of a vertical wall so that the worker can snap a vertical chalk line on the wall.

Thus, one can work by himself with greater job efficiency.

Numerous additional uses can be found for the construction layout block of the invention by those skilled in the art.

CONCLUSION

The present invention is thus provided. Various features, parts, subcombinations and combinations of the invention may be employed and/or provided with or without reference to various other features, parts, subcombinations or combinations, and numerous and sundry adaptations and modifications can be effected within its spirit, the literal claim scope of which is particularly pointed out as follows.

We claim:

1. A construction layout block comprising a triangularly shaped body having a triangular bottom; a top; a base wall and two side walls extending up from said bottom; base wall junctures formed about intersections of said base wall and said side walls, and an apex juncture formed about intersections of said side walls; and a laser target notch, which has a vertical wall that can be observed from a position both external to the boundaries of the block and normal to the vertical wall of the notch; wherein the block has relative immovability to resist a force of pulling on a chalk line with the same attached to the block during layout.

2. The block of claim 1, which is generally in the form of a right isosceles triangular prism.

3. The block of claim 1, which further includes an artifice capable of holding a chalk line.

4. The block of claim 3, which further includes a ruler scale, wherein the scale is at least one of a horizontally oriented ruler scale and a vertically oriented ruler scale.

5. The block of claim 3, wherein said base wall defines a rear of the block; and reference and alignment systems are present on the rear and top.

6. The block of claim 3, wherein the artifice capable of holding a chalk line includes a first artifice capable of holding the chalk line positioned inclusively from a first of the base wall angle junctures to the apex juncture, and at least one second artifice capable of holding the chalk line positioned from a second of the base wall angle junctures and up to but excluding the apex juncture.

7. The block of claim 6, wherein the laser target notch has an intrinsic laser card sight on a wall thereof.

8. The block of claim 6, wherein the artifice capable of holding a chalk line further includes a set of vertically oriented artifices capable of holding a chalk line.

9. A construction layout block comprising a triangularly shaped body having a triangular bottom; a base wall and two side walls extending up from said bottom; base wall junctures formed about intersections of said base wall and said side walls, and an apex juncture formed about intersections of said side walls; a top; a first artifice capable of holding a chalk line positioned inclusively from a first of the base wall angle junctures to the apex juncture, and at least one second artifice capable of holding a chalk line positioned from a second of the base wall angle junctures and up to but excluding the apex juncture; a laser target notch located at the apex juncture; a ruler scale, and a contrivance for holding a tape measure by its distal end—wherein the block has relative immovability to resist a force of pulling on a chalk line with the same attached to the block during layout.

10. The block of claim 9, wherein said first and at least one second artifices are in a form of a notch or slit opening to said bottom, through a lower part of said wall, into which notch or slit opening a distal tab of the chalk line may be inserted and lodged behind said wall, with the line portion of the chalk line threaded out through said notch or slit opening in said wall to secure the chalk line until repositioning of the line and tab.

11. The block of claim 9, wherein the relative immobility is accomplished by and consists essentially of providing the block with sufficient mass to resist force of layout with the chalk line, another line, or a tape measure.

12. The block of claim 9, wherein the laser target notch has an intrinsic laser card sight on a wall thereof; and the ruler scale is at least one of a horizontally oriented ruler scale and a vertically oriented ruler scale.

13. The block of claim 12, wherein the contrivance for holding a tape measure by its distal end includes a groove parallel with at least one wall of the block.

14. The block of claim 12, wherein the contrivance for holding a tape measure by its distal end includes an upstanding pin with a head on top thereof.

15. The block of claim 12, which has a set of vertically oriented artifices capable of holding a chalk line, said set positioned about at least one of said base wall junctures.

16. The block of claim 12, wherein said base wall defines a rear of the block, and reference and alignment systems are present on the rear and top.

17. A construction layout block comprising a substantially prismatically triangularly shaped body, having a triangular bottom surface; a base wall and two side walls extending up from said bottom; base wall junctures formed about intersections of said base wall and said side walls, and an apex juncture formed about intersections of said side walls; a top surface, which is separated from by a substantial distance, opposes, and is substantially the same size and shape as the bottom surface, which is substantially planar, and which intersects with and spans substantially completely among said walls, such that the block is generally in the form of a triangular prismatic block having five major external surfaces to form a wedge shape for the block body; and at least one of the following features:

an artifice capable of holding a chalk line;

a top carrying handle;

a laser target notch;

a rear reference system;

a top alignment system;

a ruler scale;

an intrinsic level; and a contrivance for holding a tape measure by its distal end;

wherein the block has relative immovability to resist a force of pulling on a chalk line with the same attached to the block during layout.

18. The block of claim 17, which includes the laser target notch; which is generally in the form of a right isosceles triangular prism; and wherein the relative immobility is accomplished by and consists essentially of providing the block with sufficient mass to resist force of layout with the chalk line, another line, or a tape measure.

19. The block of claim 17, which is generally in the form of a right isosceles triangular prism, wherein the base and side walls are about five inches in height;

the base wall is about nine and one quarter inch in length;

the side walls are about six and one half inches in length;

the bottom surface is separated from the top surface by a distance of about from four and three quarters to four and seven eighths of an inch;

the artifice capable of holding a chalk line is present and includes a first artifice capable of holding a chalk line positioned inclusively from a first of the base wall angle junctures to the apex juncture, and at least one second artifice capable of holding a chalk line positioned from a second of the base wall angle junctures and up to but excluding the apex juncture wherein said first and at least one second artifices are in a form of a notch or slit opening through a lower part of at least one of the side walls, which forms a skirt above which the bottom surface resides, into which notch or slit opening a distal tab of the chalk line may be inserted and lodged behind said skirt, with the line portion of the chalk line threaded out through said notch or slit opening in said skirt to secure the chalk line until repositioning of the line and tab;

the ruler scale is present; and the contrivance for holding a tape measure by its distal end is present.

20. The block of claim 17, which is plastic coated.

* * * * *